US009980503B2

(12) United States Patent
Morgret et al.

(10) Patent No.: US 9,980,503 B2
(45) Date of Patent: May 29, 2018

(54) CHEWING GUMS AND GUM BASES COMPRISING MULTI-BLOCK COPOLYMERS

(75) Inventors: Leslie D. Morgret, Chicago, IL (US); Michael S. Haas, Naperville, IL (US); Marc A. Hillmyer, Minneapolis, MN (US); Wilhelm Risse, Dublin (IE); Frank S. Bates, Saint Louis Park, MN (US); Mark T Martello, Saint Paul, MN (US); Sangwoo Lee, Minneapolis, MN (US)

(73) Assignees: Regents of the University of Minnesota, Minneapolis, MN (US); Wm. Wrigley Jr. Company, Chicago, IL (US)

( * ) Notice: Subject to any disclaimer, the term of this patent is extended or adjusted under 35 U.S.C. 154(b) by 755 days.

(21) Appl. No.: 14/003,998

(22) PCT Filed: Mar. 9, 2012

(86) PCT No.: PCT/US2012/028450
§ 371 (c)(1),
(2), (4) Date: Jan. 16, 2014

(87) PCT Pub. No.: WO2012/122459
PCT Pub. Date: Sep. 13, 2012

(65) Prior Publication Data
US 2014/0161931 A1 Jun. 12, 2014

Related U.S. Application Data

(60) Provisional application No. 61/450,846, filed on Mar. 9, 2011, provisional application No. 61/538,359, filed on Sep. 23, 2011.

(51) Int. Cl.
*A23G 4/08* (2006.01)
*C08G 63/66* (2006.01)
*C08G 81/00* (2006.01)
*A23G 4/12* (2006.01)

(52) U.S. Cl.
CPC ............... *A23G 4/08* (2013.01); *A23G 4/123* (2013.01); *C08G 63/66* (2013.01); *C08G 81/00* (2013.01)

(58) Field of Classification Search
CPC ........... A23G 4/08; C08G 81/00; C08G 63/66
See application file for complete search history.

(56) References Cited

U.S. PATENT DOCUMENTS

| | | | |
|---|---|---|---|
| 3,932,328 A * | 1/1976 | Korpman | C09J 7/0221 428/355 BL |
| 4,525,363 A * | 6/1985 | D'Amelia | A23G 4/06 426/3 |
| 4,883,700 A * | 11/1989 | Harpell | B29C 70/14 152/451 |
| 5,424,080 A | 6/1995 | Synosky et al. | |
| 5,672,367 A | 9/1997 | Grijpma et al. | |
| 6,613,363 B1 | 9/2003 | Li | |
| 6,824,734 B2 * | 11/2004 | Boggs | B29C 47/0026 264/209.5 |
| 7,833,555 B2 | 11/2010 | Andersen et al. | |
| 8,211,980 B2 | 7/2012 | Cosgrove et al. | |
| 8,293,295 B2 | 10/2012 | Andersen et al. | |
| 8,591,967 B2 | 11/2013 | Andersen et al. | |
| 2004/0180111 A1 | 9/2004 | Anderson et al. | |
| 2005/0244538 A1 | 11/2005 | Anderson et al. | |
| 2006/0121156 A1 | 6/2006 | Andersen et al. | |
| 2006/0165842 A1 | 7/2006 | Andersen et al. | |
| 2006/0240144 A1 | 10/2006 | Shalaby et al. | |
| 2007/0104829 A1 | 5/2007 | Soper et al. | |
| 2007/0155906 A1 * | 7/2007 | Hissink | A61K 9/1647 525/242 |
| 2007/0172541 A1 | 7/2007 | Donaire et al. | |
| 2008/0057153 A1 | 3/2008 | Cosgrove et al. | |
| 2008/0063609 A1 | 3/2008 | Nissen | |

(Continued)

FOREIGN PATENT DOCUMENTS

| | | | |
|---|---|---|---|
| EP | 0711506 A2 | 5/1996 | |
| GB | 971182 A * | 9/1964 | ............... A23G 4/06 |

(Continued)

OTHER PUBLICATIONS

Kraton™ Polymer for Modification of Thermoplastics. 2000. pp. 1-18.*
Fragouli, P.G., Iatrou, H., Hadjichristidis, N. 2004. "Synthesis and Characterization of Linear Tetrablock Quarterpolymers of Styrene, Isoprene, Dimethylsiloxane, and 2-Vinylpyridine." Journal of Polymer Science Part A: Polymer Chemistry. vol. 42, pp. 514-519.*
Holden, G. & Kricheldorf, H., Thermoplastic Elastomers, 3rd Edition, Hanser Publishing Company, pp. 15-43 and 458-492, 2004, Germany.
Hermel, T. J. et al., Role of Molecular Architecture in Mechanical Failure of Glassy/Semicrystalline Block Copolymers: CEC vs CECEC Lamellae, Macromolecules, American Chemical Society, vol. 36, pp. 2190-2193, 2003, USA.

(Continued)

*Primary Examiner* — Nikki H. Dees
(74) *Attorney, Agent, or Firm* — Fish & Richardson P.C.

(57) ABSTRACT

Chewing gums and chewing gum bases which are cud-forming and chewable at mouth temperature contains a multi-block copolymer having at least two repeating sequences of at least two different polymeric blocks having at least three monomer units each. The multi-block copolymer optionally includes linking units and may be formulated to have non-covalent crosslinking between the copolymer chains. The multi-block copolymer is optionally plasticized with a compatible di-block copolymer to function as an elastomer system in the gum base. Characteristics of the multi-block copolymers can be selected to produce gum bases and chewing gums having desired properties. In some cases, chewed cuds formed from the gum bases may exhibit improved removability from environmental surfaces to which they may become undesirably attached.

20 Claims, 5 Drawing Sheets

(56) References Cited

U.S. PATENT DOCUMENTS

| | | |
|---|---|---|
| 2008/0107770 A1 | 5/2008 | Wittorff et al. |
| 2008/0166448 A1 | 7/2008 | Wittorff et al. |
| 2008/0260900 A1 | 10/2008 | Wittorff et al. |
| 2009/0028998 A1 | 1/2009 | Elejalde et al. |
| 2009/0130250 A1 | 5/2009 | Andersen et al. |
| 2009/0226383 A1 | 9/2009 | Andersen et al. |
| 2010/0068339 A1 | 3/2010 | Neergaard |
| 2010/0215799 A1 | 8/2010 | Cosgrove et al. |
| 2010/0303954 A1 | 12/2010 | Donaire et al. |
| 2011/0111084 A1 | 5/2011 | Neergaard |
| 2013/0045298 A1 | 2/2013 | Andersen et al. |
| 2016/0130382 A1 | 5/2016 | Pears et al. |

FOREIGN PATENT DOCUMENTS

| | | | |
|---|---|---|---|
| WO | 2002076231 A1 | 10/2002 | |
| WO | WO2007076425 | 7/2007 | |
| WO | WO 2007076856 A1 * | 7/2007 | ............... A23G 4/08 |
| WO | WO2008002337 A1 | 2/2008 | |
| WO | 2008037251 A1 | 4/2008 | |
| WO | 2008104546 A1 | 9/2008 | |
| WO | 2008145120 A1 | 12/2008 | |
| WO | 2011032026 A2 | 3/2011 | |
| WO | 2012122459 A1 | 9/2012 | |

OTHER PUBLICATIONS

Wu, L. et al., Consequences of Block Number on the ODT and Viscoelastic Properties of Linear (AB)n Multiblock Copolymers, Macromolecules, vol. 37, pp. 3360-3368, 2004, American Chemical Society, USA.

Cohn, D., Biodegradable Multiblock PEO/PLA TPEs Molecular Design and Properties, Polymer, Elsevier, vol. 46, pp. 2068-2075, 2005, USA.

Koo, C-M. et al., Structure and Properties of Semicrystalline—Rubbery Multiblock Copolymers, Macromolecules, American Chemical Society, vol. 39, pp. 667-677, 2006, USA.

Zeng, J-B. et al, A Novel Biodegradable Multiblock Poly(Ester Urethane) Containing Poly(l-Lactic Acid) and Poly (Butylene Succinate) Blocks, Elsevier, Polymer, vol. 50, pp. 1178-1186, 2009, USA.

Wang, H. P., Comparing Elastomeric Behavior of Block and Random Ethylene-Octene Copolymers, Journal of Applied Polymer Science, vol. 113, pp. 3236-3244, 2009, USA.

Moravek, S. et al., Seawater Degradable Thermoplastic Polyurethanes, Journal of Applied Polymer Science, Journal of Applied Polymer Science, vol. 115, pp. 1873-1880, 2010, USA.

Wu, J. et al., PEG-POSS Multiblock Polyurethanes: Synthesis, Characterization, and Hydrogel Formation, American Chemical Society, vol. 43, pp. 7637-7649, 2010, USA.

Hitachi, Application Brief DC Measurements of Polystyrene—The Effects of Molecular Weight on Glass transition, Hitachi High-Tech Science Corporation, TA No. 68, Aug. 1995, available at http://www.hitachi-hitec-science.com/en/documents/technology/thermal_analysis/application_ TA_068e.pdf.

SEC of Homopolymer, Polystyrene Sample p4250-S, http://www.polymersource.com/dataSheet/P4250-S.pdf.

Holden, G. & Kricheldorf, H., Thermoplastic Elastomers, 3rd Edition, Hanser Publishing Company, pp. 15-43 and 453-520, 2004, Germany.

* cited by examiner

Figure 1a: Graphic Illustration of Possible Microphase Separation Internal Structures of Multi-block Copolymers.
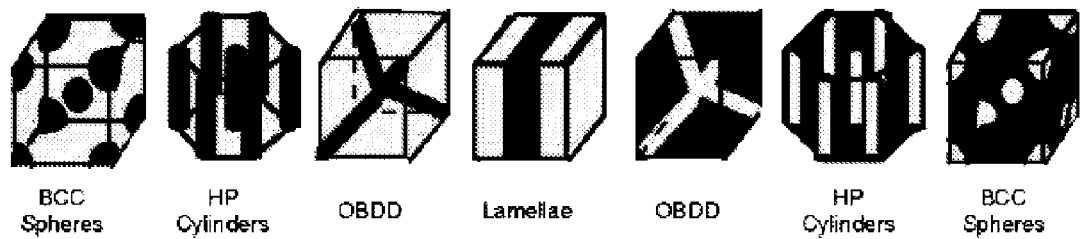
BCC Spheres | HP Cylinders | OBDD | Lamellae | OBDD | HP Cylinders | BCC Spheres
Figure 1b: Graphic Illustration of a Bicontinuous Microphase Separation Internal Structure of Multi-block Copolymers
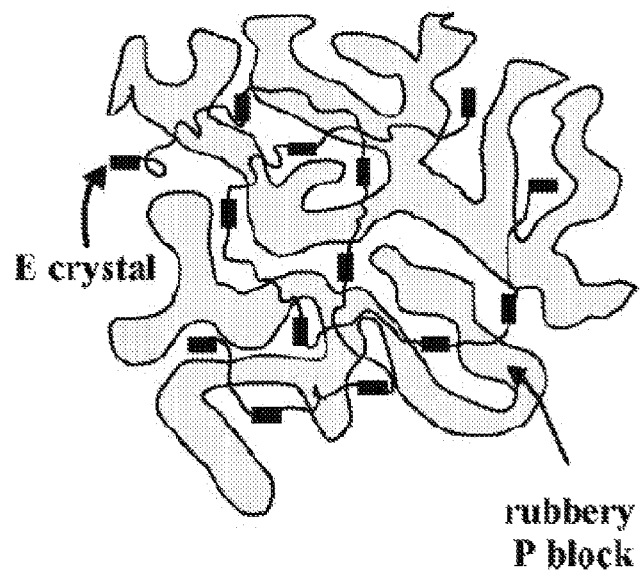
E crystal
rubbery P block

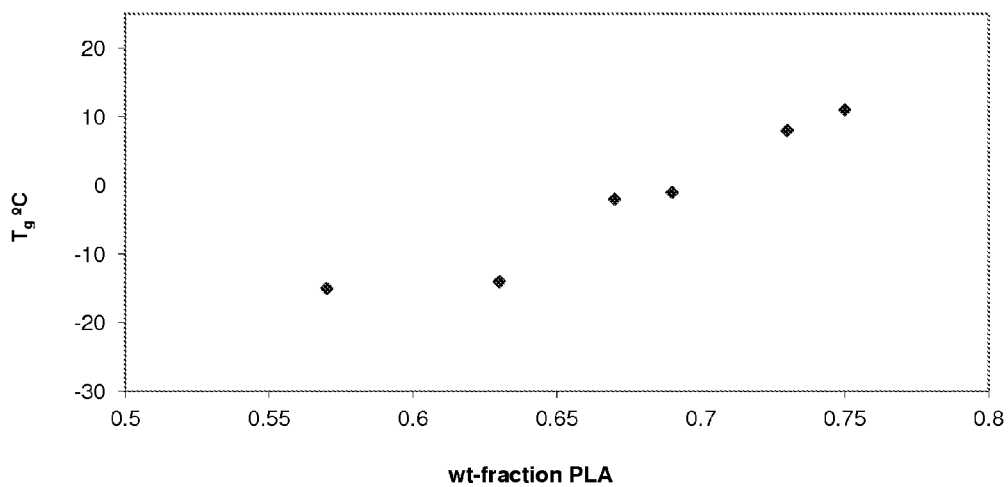
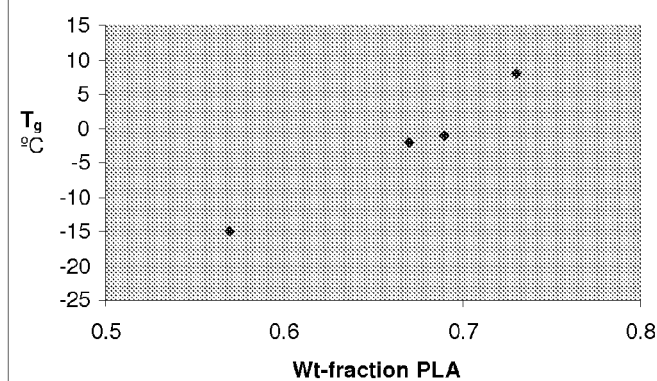

¹H NMR Spectrum of the Multi-Block Copolymer of Example 7 (in CDCl₃)
(PLA-PEO-PLA-x-)ₙ [1.7k-2.0k-1.7k]

$^1$H NMR Spectrum of the Multi-Block Copolymer of Example 44 (in CDCl$_3$) (PLA-PEO-PLA-x-)$_n$ [1.7k-2.0k-1.7k]

1H NMR Spectrum of the Multi-Block Copolymer of Example 5 (in CDCl3)
(PLA-PEO-PLA-x-)n [1.7k-1.5k-1.7k]

$^{13}$C NMR spectrum of Example 48 - *poly*(δ-decalactone) (A); *poly*(D,L-lactide) (B); and Example 49 - *poly*(D,L-lactide-*b*-δ-decalactone-*b*-D,L-lactide) (C).

CHEWING GUMS AND GUM BASES COMPRISING MULTI-BLOCK COPOLYMERS

PRIORITY DATA

The present patent application is a 371 of International Application Ser. No. PCT/US12/28450 filed Mar. 9, 2012, which claims benefit from U.S. Provisional Ser. Nos. 61/450,846, filed Mar. 9, 2011, and 61/538,359 filed Sep. 23, 2011, and incorporates the above applications by reference herein as if they are fully restated herein.

BACKGROUND OF THE INVENTION

The present invention relates to chewing gum. More specifically, this invention relates to improved formulations for chewing gum bases and chewing gums containing multi-block copolymers having at least two different component polymeric blocks. In some embodiments, the multi-block copolymer includes linking units to increase the chain length and molecular weight.

In some embodiments, the multi-block copolymers include at least one polymeric block or linking agent that includes hydrogen bond donor and at least one polymeric block or linking agent that includes hydrogen bond acceptor. The chewing gums and gum bases of the present invention may exhibit improved removability from concrete and other environmental surfaces.

The fundamental components of a chewing gum typically are a water-insoluble gum base portion and a water-soluble bulking agent portion. The primary component of the gum base is an elastomeric polymer which provides the characteristic chewy texture of the product. The gum base will typically include other ingredients which modify the chewing properties or aid in processing the product. These include plasticizers, softeners, fillers, emulsifiers, plastic resins, as well as colorants and antioxidants. The water-soluble portion of the chewing gum typically includes a bulking agent together with minor amounts of secondary components such as flavors, high-intensity sweeteners, colorants, water-soluble softeners, gum emulsifiers, acidulants and sensates. Typically, the water-soluble portion, sensates, and flavors dissipate during chewing and the gum base is retained in the mouth throughout the chew.

One problem with traditional gum bases is the nuisance of gum litter when chewed gum cuds are improperly discarded. While consumers can easily dispose of chewed cuds in waste receptacles, some consumers intentionally or accidentally discard cuds onto sidewalks and other environmental surfaces. The nature of conventional gum bases can cause the improperly discarded cuds to adhere to the environmental surface and subsequently to be trampled by foot traffic into a flattened embedded mass which can be extremely difficult to remove.

SUMMARY OF THE INVENTION

This invention is directed to novel chewing gums and gum bases comprising food acceptable multi-block copolymers having at least two repeating sequences of two or more polymer blocks having at least three monomer units each. In some embodiments, the multi-block copolymer will include linking units between some or all of the repeating sequences.

In some embodiments, the two or more polymeric blocks and/or the linking unit (if present) will collectively comprise at least one hydrogen bond donor group and at least one hydrogen bond acceptor group. The presence of the hydrogen bond groups allows hydrogen bond crosslinks to form between adjacent multiblock copolymer chains to increase elasticity of the polymer system to enable it to function as a chewing gum elastomer.

By manipulating the components and characteristics of the multi-block copolymer, product formulators can "tune" the properties of the gum base to produce chewing gum products which appeal to a variety of consumer in different markets. In some embodiments, chewing gums and gum bases of the present invention, upon chewing, produce cuds which have reduced adhesion to environmental surfaces when compared to most commercially available chewing gums.

BRIEF DESCRIPTION OF THE DRAWINGS

FIG. 1a is a graphic illustration of possible microphase separation internal structures of multi-block copolymers.

FIG. 1b is a graphic illustration of a bicontinuous microphase separation internal structure of multi-block copolymers FIG. 2 is a plot of the polymer glass transition temperature against the weight fraction of PLA in the multi-block copolymers of Examples 1-7.

FIG. 3 is a plot of polymer glass transition temperature vs. PLA cont for 1.5 k PEO.

DESCRIPTION OF THE INVENTION

Figure 4:
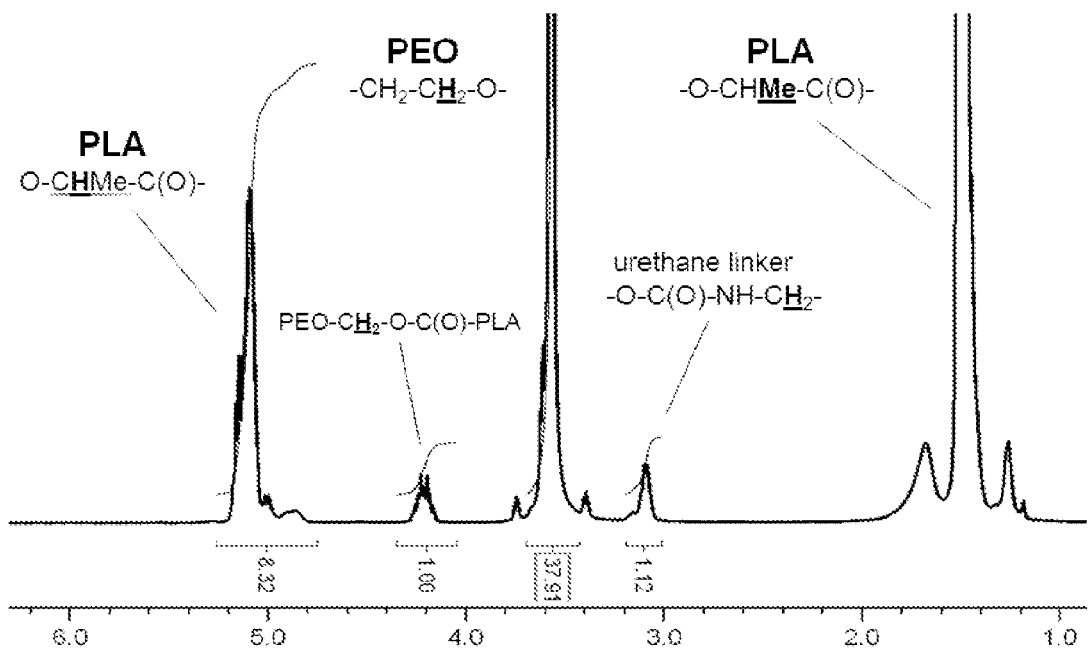
FIG. 4 is an nmr spectrum of the multi-block copolymer of Example 7.

The present invention provides improved chewing gum formulations and chewing gum bases, as well as methods of producing chewing gum and chewing gum bases. In accordance with the present invention, novel chewing gum bases and chewing gums are provided that include a multi-block copolymer having at least two different polymeric blocks each containing at least five monomeric units. Such multi-block polymers may be designated as $(A-B)_n$ or $(A-B-C)_n$ in the cases where there are two or three different polymeric blocks (respectively) repeated n times. It is possible that the repeating sequence may include more than one polymeric block of the same monomeric composition, for example $(A-B-A)_n$. In such cases, the A blocks contained within the chain will effectively be twice as long as A blocks at the end of the chain, for example A-B-A-A-B-A-A-B-A in the case where n=3.

In some embodiments, there will be three repeating sequences or more or four or more repeating sequences or five or more repeating sequences. In some embodiments, each repeating sequence will include exactly two or exactly three or exactly four or more different polymeric blocks. In some embodiments, each polymeric block will contain at least 5 or at least 10 or at least 20 monomeric units. In some embodiments, the different polymeric blocks will have substantially different numbers of monomeric units. For example, the A blocks may be about 8 units long while the B blocks will be about 20 units long. It will be recognized that it is neither necessary nor possible in all cases to produce multi-block copolymers in which all blocks of one type (e.g. A blocks) have exactly the same length. For purposes of the present invention, the requirement that the blocks have at least five monomer units will be understood to mean that the average length will be at least five units with the possibility that some individual blocks might be slightly shorter. The use of such short blocks produces a multi-block copolymer having a low $T_g$ even when larger polymeric blocks of the same composition would have a higher $T_g$.

In some embodiments, a linking unit, designated X, may be present between some or all of the repeating sequences. Thus the multi-block copolymer may be designated as $(A-B-X)_n$ in the case where there are a total of n sequences of two repeating blocks where a linking unit is located between each repeating sequence. Suitable linking agents are capable of connecting polymer blocks via covalent chemical bonding and may provide for inter- and intramolecular non-covalent bonding, such as hydrogen bonding or dipolar interaction. Examples of linking agents which may be useful in the present invention include urethanes, esters, amides, carbonates, carbamates, urea, dialkylsiloxy- and diarylsiloxy-based units, ethers, thioethers and olefins. Urethane-based units may optionally include urea structures.

The linking unit may be used to extend the length of the multi-block, thereby increasing its elastomeric properties. In some embodiments it will be desirable to build the multi-block chain up to a molecular weight ($M_n$) to at least 5,000 daltons or 10,000 daltons or at least 50,000 daltons or at least 100,000 daltons or at least 200,000 daltons or even at least 500,000 daltons. Unless otherwise specified, all molecular weights will refer to number average molecular weights, $M_n$.

Alternatively, the techniques of click chemistry may be used to build and extend the multi-block copolymer chain.

In general, the individual polymeric blocks (herein represented by A, B, C, etc.) may be of any monomer suitable for the purpose. By suitable, it is meant that multiblock copolymers containing the monomer are food acceptable and that they will contribute to making a multiblock polymer capable of producing a cud having sensorially acceptable texture and chewing properties at mouth temperature. Examples of such polymer blocks include homopolymers, alternating copolymers and random copolymers of lactic acid, ethylene glycol, propylene glycol, D,L-lactide, D-lactide, L-lactide, vinylacetate, ethylene terephthalate, glycolic acid, ethylene, propylene, butane, butadiene, isoprene, 6-methylcaprolactone, 6-butyl-ε-caprolactone, delta-decalactone, farnesene, myrcene, isoprene, urethane, 6-methylcaprolactone, 6-butyl-ε-caprolactone, alkyl or aryl substituted ε-caprolactones, dimethylsiloxane and other siloxanes, cyclooctene, vinyllaurate, ethylene oxide, oxymethylene, menthide, caprolactone, valerolactone, propiolactone, betabutyrolactone, trimethylene carbonate, methacrylate and dimethylbutadiene.

In some embodiments the one or more polymeric blocks and/or the optional linking units will include chemical groups capable of forming non-covalent bonds (i.e. hydrogen bonds or ionic bonds) with each other. This non-covalent bonding creates weak crosslinks within and/or between the multi-block copolymer chains. These weak bonds generate or improve the ability for the multi-block copolymer to act as an elastomer in the gum base, especially at lower molecular weights. This may allow the multi-block copolymer to act as an effective chewing gum elastomer at molecular weights as low as 2,000 daltons, or as low as 5,000 daltons or as low as 10,000 daltons. With the cross-linking, it may be possible to create effective chewing gum elastomers using multi-block copolymers having molecular weights no more than 50,000 daltons or no more than 30,000 daltons or no more than 20,000 daltons. The non-covalent crosslinking may also enhance formation of the previously mentioned microphase separation structures in the mass of a chewed gum cud. Such internal structures are believed to improve removability of the cud from environmental surfaces to which it may have become undesirably attached.

In some embodiments, the non-covalent crosslinking will be accomplished by hydrogen bonding. Hydrogen bonding is the attractive interaction of a hydrogen atom with an electronegative atom, such as nitrogen or oxygen, that comes from another molecule or chemical group. The hydrogen must be covalently bonded to another electronegative atom to create the bond. In such cases, the multi-block copolymer will include at least one polymeric block and/or linking unit that (collectively) include a hydrogen bond donor group and at least one hydrogen bond acceptor group. The hydrogen bond donor group is typically a hydrogen atom which is covalently attached to an oxygen or nitrogen atom. The hydrogen bond acceptor group is typically an oxygen or nitrogen covalently attached to the polymer, whether it is also covalently attached to a hydrogen atom or not. Thus, in some cases, the same group may act as both a hydrogen bond donor and acceptor. An example of a monomeric unit that includes a hydrogen bond donor would be a urethane linking unit which contains an NH group as part of the polymeric chain. The urethane linking unit can also act as a hydrogen bond acceptor due to the presence of the NH group and also a C=O group. Polymeric groups which can also act as hydrogen bond acceptors include polylactides, polyvinyl acetate, poly(ethylene glycol) homopolymers and substituted and unsubstituted polycaprolactones, urea, amides, among others which include NH, C=O or C—O—C groups.

In some embodiments of the present invention, at least two of the at least two polymeric blocks will be immiscible with each other. In some embodiments, at least some of the polymeric blocks will have a glass transition temperature ($T_g$) of less than 70° C., or less than 60° C. or less than 50° C., or less than 40° C. In some embodiments, the different polymeric blocks will have significantly different glass transition temperatures from each other to enhance the elastomeric properties of the multi-block copolymer.

By manipulating the overall molecular weight, the size and monomer composition of the polymer blocks, the number of the repeating sequences and the presence and frequency of non-covalent crosslinking groups, a product developer may produce a multi-block copolymer having the best combination of chewing texture, removability and processing properties. In some cases, the polymer may be tuned for specific chewing gum compositions, using different parameters for different flavors to compensate for different degrees of plasticization by the flavors. In other cases, the polymer may be "tuned" for a particular marketplace to account for differences in local climate and consumer preferences. The multi-block copolymer hay also be tuned to maximize removability of chewed cuds form environmental surfaces by promoting the formation of microphase separation internal structures as previously discussed.

A wide variety of gum base and chewing gum formulations including the multi-block copolymers of the present invention can be created and/or used. In some embodiments, the present invention provides for gum base formulations which are conventional gum bases that include wax or are wax-free. In some embodiments, the present invention provides for chewing gum formulations that can be low or high moisture formulations containing low or high amounts of moisture-containing syrup. Low moisture chewing gum formulations are those which contain less than 1.5% or less than 1% or even less than 0.5% water. Conversely, high moisture chewing gum formulations are those which contain more than 1.5% or more than 2% or even more than 2.5% water. The multi-block copolymers of the present invention can be used in sugar-containing chewing gums and also in low sugar and non-sugar containing gum formulations made with sorbitol, mannitol, other polyols (sugar alcohols), and non-sugar carbohydrates.

In some embodiments, a multi-block copolymer of the present invention may be used as the sole elastomer. In other embodiments it will be combined with other base elastomers for use in chewing gum base. Such other elastomers, where used, include synthetic elastomers including polyisobutylene, isobutylene-isoprene copolymers, styrene-butadiene copolymers, polyisoprene, polyolefin thermoplastic elastomers such as ethylene-propylene copolymer and ethylene-octene copolymer, tri-block copolymers having the structure A-B-A or A-B-C and combinations thereof. Natural elastomers that can be used include natural rubbers such as chicle and proteins such as zein or gluten and modified starches such as starch laureates and starch acetates. In some embodiments, the multiblock copolymers may be blended with removable or environmentally degradable polymers such as polylactides, and polyesters prepared from food acceptable acids and alcohols. However, it is preferred that the multi-block copolymers of the present invention constitute the sole elastomers used in the gum base.

It is important that the multi-block copolymers of the present invention be food grade. While requirements for being food grade vary from country to country, food grade polymers intended for use as masticatory substances (i.e. gum base) will typically have to meet one or more of the following criteria. They may have to be specifically approved by local food regulatory agencies for this purpose. They may have to be manufactured under "Good Manufacturing Practices" (GMPs) which may be defined by local regulatory agencies, such practices ensuring adequate levels of cleanliness and safety for the manufacturing of food materials. Materials (including reagents, catalysts, solvents and antioxidants) used in the manufacture will desirably be food grade (where possible) or at least meet strict standards for quality and purity. The finished product may have to meet minimum standards for quality and the level and nature of any impurities present, including residual monomer content. The manufacturing history of the material may be required to be adequately documented to ensure compliance with the appropriate standards. The manufacturing facility itself may be subject to inspection by governmental regulatory agencies. Again, not all of these standards may apply in all jurisdictions. As used herein, the term "food grade" will mean that the multi-block copolymers meet all applicable food standards in the locality where the product is manufactured and/or sold.

In some embodiments of this invention, the multi-block copolymer is combined with a di-block copolymer comprising two polymer blocks which are individually compatible with at least two of the blocks which make up the multi-block copolymer. In these embodiments, the di-block copolymer plasticizes the multi-block copolymer to provide a plasticized elastomer material which is consistent with the chew properties of conventional elastomer/plasticizer systems. The di-block copolymer may also provide additional benefits such as controlling release of flavors, sweeteners and other active ingredients, and reducing surface interactions of discarded cuds for improved removability from environmental surfaces. Furthermore, the di-block copolymer may better help maintain the microphase separation structures in the multi-block copolymer as compared to other plasticizers.

By compatible, it is meant that the component polymers (when separate from the multi-block or di-block configuration) have a chemical affinity and can form a miscible mixture which is homogeneous on the microdomain scale. This can normally be determined by a uniform transparent appearance. In cases where uncertainty exists, it may be helpful to stain one of the polymers in which case the mixture will, when examined with microscopic methods, have a uniform color if the polymers are compatible or exhibit swirls or a mottled appearance if the polymers are incompatible. Compatible polymers typically have similar solubility parameters as determined empirically or by computational methods. In preferred embodiments, at least two of the at least two polymer blocks which comprise the multi-block copolymer will be essentially identical to those of the di-block copolymer to ensure the greatest possible compatibility. Further information on polymer compatibility may be found in Pure & Appl. Chem, Vol 58, No. 12, pp 1553-1560, 1986 (Krause) which is incorporated by reference herein.

In some embodiments, the multi-block copolymers of the present invention are elastomeric at mouth temperature in the sense of having an ability to be stretched to at least twice of an original length and to recover substantially to such original length (such as no more than 150%, preferably no more than 125% of the original length) upon release of stress. Preferably, the polymer will also be elastomeric at room temperature and even lower temperatures which may be encountered in the outdoor environment.

In preferred embodiments of the present invention, cuds formed from gum bases containing multi-block copolymers are readily removable from concrete if they should become adhered to such a surface. By readily removable from concrete, it is meant that the cuds which adhere to concrete can be removed with minimal effort leaving little or no adhering residue. For example, readily removable cuds may be removable by use of typical high pressure water washing apparatuses in no more than 20 seconds leaving no more than 20% residue based on the original area covered by the adhered cud. In some cases, a readily removable cud may be peeled off of a concrete surface by grasping and pulling with fingers leaving no more than 20% residue by area of the original cud. Alternatively, a more formal test can be conducted as follows. Two grams of gum is chewed or manually kneaded under water for 20 minutes to produce a cud. The cud is then immediately placed on a concrete paver stone and covered with silicone coated paper. 150 to 200 pounds of pressure is applied to the cud (for example by stepping on it with a flat soled shoe) for approximately two seconds. The silicone-coated paper is then removed and the adhered cud and paver stone are conditioned at 45° C./60% RH for 48 hours. A flat-edged metal scraper held at a 15° angle is used to make a single scrape of the cud over approximately three to five seconds. The results are then evaluated using image analysis software, such as ImageJ 1.41o from the National Institutes of Health, to measure the portion of the cud remaining. Readily removable cuds will leave no more than 20% of the original mass as residue and require no more than approximately 50 N of force. Of course, it is desirable that the cud leave even less residue and require less force to remove.

In some embodiments, the multi-block copolymer or multi-block/di-block copolymer blend (hereinafter the multi-block elastomer system) will be the sole component of the insoluble gum base. In other embodiments, the multi-block copolymer or multi-block elastomer system will be combined with softeners, fillers, colors, antioxidants and other conventional gum base components. In some embodiments, the multi-block copolymer or multi-block elastomer system gum bases may be used to replace conventional gum bases in chewing gum formulas which additionally contain water-soluble bulking agents, flavors, high-intensity sweeteners, colors, pharmaceutical or nutraceutical agents and other optional ingredients. These chewing gums may be formed into sticks, tabs, tapes, coated or uncoated pellets or balls or any other desired form. By substituting the multi-block copolymer or multi-block elastomer system of the present invention for a portion or all of the conventional gum base elastomers, consumer-acceptable chewing gum products can be manufactured which exhibit reduced adhesion to environmental surfaces, especially concrete.

In order to further enhance the removability of cuds formed from gum bases comprising the multi-block copolymer systems of the present invention, it may be desirable to incorporate other known removability-enhancing features into the chewing gum or gum base. For example, certain additives such as emulsifiers and amphiphilic polymers may be added. Another additive which may prove useful is a polymer having a straight or branched chain carbon-carbon polymer backbone and a multiplicity of side chains attached to the backbone as disclosed in WO 06-016179. Still another additive which may enhance removability is a polymer comprising hydrolyzable units or an ester and/or ether of such a polymer. One such polymer comprising hydrolyzable units is a copolymer sold under the Trade name Gantrez®. Addition of such polymers at levels of 1 to 20% by weight of the gum base may reduce adhesion of discarded gum cuds. These polymers may also be added to the gum mixer at a level of 1 to 7% by weight of the chewing gum composition.

Another gum base additive which may enhance removability of gum cuds is high molecular weight polyvinyl acetate having a molecular weight of 100,000 to 600,000 daltons as disclosed in US 2003/0198710. This polymer may be used at levels of 7 to 70% by weight of the gum base.

Another approach to enhancing removability of the present invention involves formulating gum bases to contain less than 5% (i.e. 0 to 5%) of a non-silica filler such as a calcium carbonate and/or talc filler and/or 5 to 40% amorphous silica filler. Formulating gum bases to contain 5 to 15% of high molecular weight polyisobutylene (for example, polyisobutylene having a weight average or number average molecular weight of at least 200,000 daltons) is also effective in enhancing removability. High levels of emulsifiers such as powdered lecithin may be incorporated into the chewing gum at levels of 3 to 7% by weight of the chewing gum composition. It may be advantageous to spray dry or otherwise encapsulate the emulsifier to delay its release. Any combination of the above approaches may be employed simultaneously to achieve improved removability. Specifically, removability can be enhanced by incorporating a multi-block copolymer or multi-block elastomer system as previously described into a gum base having 0 to 5% of a calcium carbonate or talc filler, 5 to 40% amorphous silica filler, 5 to 15% high molecular weight polyisobutylene, 1 to 20% of a polymer having a straight or branched chain carbon-carbon polymer backbone and a multiplicity of side chains attached to the backbone and further incorporating this gum base into a chewing gum comprising 3 to 7% of an emulsifier, such as lecithin, which is preferably encapsulated such as by spray drying. Many variations on this multi-component solution to the cud adhesion problem can be employed. For example, the polymer having a straight or branched chain carbon-carbon polymer backbone or the ester and/or ether of a polymer comprising hydrolyzable units may be added to the gum mixer instead of incorporating it into the gum base, in which case it may be employed at a level of 1 to 7% of the chewing gum composition. Also, in some cases it may be desirable to omit one or more of the above components for various reasons.

Yet another approach to improving removability is to incorporated softeners or plasticizers which will leach out of the gum cud after it is discarded. This can cause the cud to become more cohesive and rigid allowing it to be popped off adhered substrates.

The multi-block copolymer or multi-block elastomer system, when used according to the present invention, affords the chewing gum consumer acceptable texture, shelf life and flavor quality. Because the multi-block copolymer or multi-block elastomer systems have chewing properties similar to other elastomers in most respects, gum bases containing them create a resultant chewing gum product that has a high consumer-acceptability.

The present invention provides in some embodiments gum base and chewing gum manufacturing processes which have improved efficiency as compared with conventional processes.

Additional features and advantages of the present invention are described in, and will be apparent from, the detailed description of the presently preferred embodiments.

Multi-block copolymers of the present invention have two or more different polymer blocks covalently bonded together, for example in an A-B, A-B-A or A-B-C configuration. In some embodiments, at least two of the at least two polymers which comprise the multi-block copolymer will be mutually incompatible. By mutually incompatible it is meant that the polymers are not compatible as previously described. By using incompatible blocks, the formation of microphase separation internal structures in chewed cuds (as previously described) may be enhanced to improve removability of the cud from environmental surfaces to which it may have become undesirably attached.

The polymeric blocks which make up the multi-block copolymers of the present invention may comprise soft polymers, hard polymers or a mixture of both. By soft polymer, it is meant that the block is composed of a polymer having a glass transition temperature substantially below mouth temperature. (For purposes of the present invention, a polymer's glass transition temperature is taken to mean the glass transition temperature of that polymer in a high molecular weight form such as 200,000 daltons, even in cases where only short blocks are present in the multi-block copolymer.) Specifically, soft polymers will have a $T_g$ below 20° C. or below 10° C. or even below 0° C. Soft polymers will also have a complex shear modulus between $10^3$ and $10^8$ Pascals at 37° C. and 1 rad/sec. Preferably, the shear modulus will be between $10^4$ and $10^7$ more preferably between $5\times10^5$ and $5\times10^6$ at 37° C. and 1 rad/sec. Examples of soft polymers include homopolymers of isoprene, butene, 6-methylcaprolactone, 6-butyl-ε-caprolactone, alkyl or aryl substituted ε-caprolactones, alkyl or aryl substituted lactones, dimethylsiloxane and other siloxanes, butadiene, cyclooctene, vinyllaurate, ethylene oxide, oxymethylene, menthide, farnesene, myrcene, delta-decalactone, epsilon-decalactone, menthide, caprolactone, valerolactone, propiolactone, betabutyrolactone, trimethylene carbonate, butadiene and dimethylbutadiene. In some embodiments, a soft polymeric block may be a random or alternating copolymer of two or more of the above monomers or any other suitable monomers. Generally, soft polymeric blocks will be non-crystalline at typical storage and mouth temperatures. However, it some cases a soft polymeric block may have some semi-crystalline domains.

In contrast, by hard polymeric blocks it is meant that the block(s) comprise essentially identical polymers or compatible or incompatible polymers having a $T_g$ above about 20° C. or above 30° C. or even above 40° C. It is also important that the hard polymer(s) have a $T_g$ sufficiently low as to allow convenient and efficient processing, especially when the multi-block copolymer or multi-block elastomer system is to be used as the sole component in a gum base. Thus the hard polymer(s) should have a $T_g$ below 70° C. and preferably below 60° C. Use of hard polymers having glass transition temperatures in this range allows lower processing temperatures, reduced mixing torque and shorter mixing times. This results in energy savings and effectively increased mixing capacity. In continuous mixing extruders the problem of excess heat buildup is reduced. Examples of hard polymers useful in the present invention include homopolymers of D,L-lactide, polylactic acid homopolymers, homopolymers of vinylacetate, poly(ethylene terephthalate) homopolymers, homopolymers of glycolic acid and poly(propyl methacrylate). Hard polymeric blocks may also be random or alternating copolymers such as a random or alternating copolymer of glycolic acid and lactic acid. Typically, hard polymeric blocks will be amorphous or semi-crystalline at storage and chewing temperatures.

The above hard and soft polymeric blocks can also be used to produce tri-block copolymers suitable for use as chewing gum elastomers.

In some embodiments soft and hard polymeric blocks which are incompatible with each other will be used to form the multi-block copolymer to maximize the formation of microphase separation internal structures.

In some cases, the multi-block copolymer may exhibit only a single glass transition temperature. This may be due to the small size of the blocks or the small total amount of individual monomers in the multi-block copolymer. Or they may be due to the different blocks being miscible together or having very similar $T_g$s. In other cases, two or more glass transitions may be observable. In some embodiments of the present invention the multi-block copolymer will exhibit at least two glass transition temperatures, the highest being between 20° C. and 70° C. (preferably between 30° C. and 50° C.) and at least one being less than 40° C. or less than 30° C. or less than 20° C. or less than 10° C. It is believed that such a polymer, when combined with any softeners and plasticizers in the gum base, will offer a desirable combination of easy processing, good chewing texture and good removability when the surface from which the cud is to be removed is between the highest $T_g$ and a lower $T_g$ of the multi-block copolymer. It is expected that plasticizers added to the base will reduce the glass transition temperatures such that the highest $T_g$ will be below mouth temperature (about 35° C.) and at least one $T_g$ will be below the temperature of concrete or other adhered substrate during the removal process. The optimal glass transition temperatures will depend on the amount and effectiveness of the plasticizers incorporated into the gum base (if any.)

Glass transition temperatures of hard and soft blocks can be conventionally measured using Differential Scanning calorimetry (DSC) as is well known in the art. Multi-block copolymers of the present invention may have DSC thermographs which display two or more glass transitions corresponding to the $T_g$ of the two or more polymeric blocks which make up the repeating sequences. In other cases the multi-block copolymer may exhibit only a single Tg which is an average of the various glass transitions of the various different blocks. (See FIG. 3.) In some cases it may be difficult to detect the hard-block transition(s), particularly when the soft block greatly exceeds 50% of the total mass of the polymer. In such cases, a homopolymer of each block may be synthesized to a high molecular weight (e.g. greater than 200,000 daltons) and tested by DSC to determine the $T_g$.

Multiblock copolymers of the present invention can be readily prepared using α,ω-difunctional telechelic polymers and condensation coupling chemistry. Polymer blocks such as polyisoprene, polylactide, and polymethylcaprolactone can be synthesized in homopolymer form with alcohol groups at both chain termini, for example, reaction of 1,4-butanediol with triethyl aluminum in toluene at 90° C. followed by addition of lactide leads to dihydroxy PLA. Other dihydroxy polyesters can be prepared using similar methods. Polymerization of isoprene using the protected initiator TIPSOPrLi [Meuler et al., 2008] followed by deprotection results in dihydroxy polyisoprene. These difunctional compounds can be linked together end-to-end using condensation chemistry. For example, excess low molecular agents such as toluene diisocyanate (TDI) can be reacted with one of the polydiols thus end capping the molecules with reactive isocyanate groups. Combining this α,ω-diisocyanate polymer product with measured amounts of polydiol will lead to urethane linkages and a multiblock copolymer. In this way, -(IL)$_n$- and -(LM)$_n$- multiblocks with specified $T_{ODT}$ and variable overall molecular weight (controlled by n) can be prepared. A key feature of this approach is the decoupling of the thermodynamically driven order-disorder transition (dictated by the primary block molecular weights, I, L and M) and the melt rheological properties, which can be controlled by the overall molecular weight (i.e., the number of blocks n). Both factors will influence the non-linear viscoelastic behavior (hence sensory response), melt processability, and gum removability.

Alternatively, the multi-block copolymer may be synthesized by the sequential chain polymerization of two or more monomers or by the sequential anionic polymerization of two or more monomers, or by the sequential free-radical polymerization of two or more monomers or by the sequential chain polymerization of two or more monomers followed by a chain coupling reaction. Of course, any synthetic route effective to produce the multi-block copolymers of the present invention may be employed An example of macromolecular structure of the multi-block copolymers is given below:

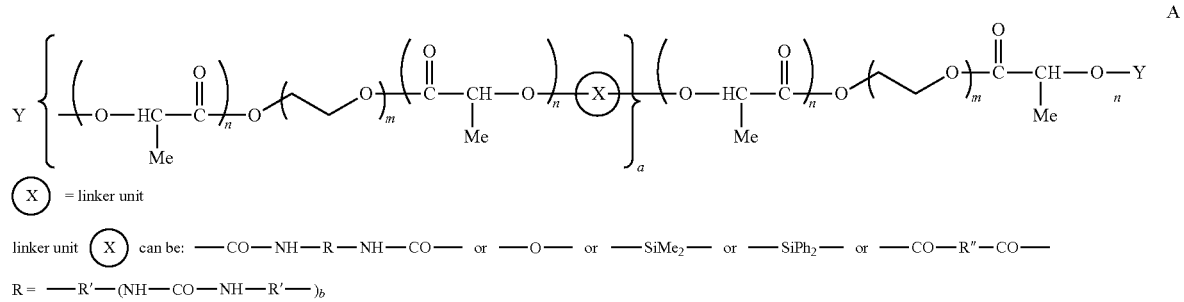

Triblock sequences polylactide-block-poly(ethylene oxide)-block-polylactide are covalently linked up by urethane linking units. The urethane linking unit contains two urethane structures (—O—CO—NH—, with CO representing a C=O double bond) and optionally one or more urea structures (—NH—CO—NH—, again CO representing C=O).

The urea structures result from the reaction of isocyanate with water: —R'—NCO+H$_2$O→R'—NH2+CO2 followed by —R'—NH2+OCN—R'—R'—NH—CO—NH—R'— where Y=H or H2N—R—NH—CO— and where Y at the two ends can be different or the same. Typical values of n, m, a and b are: $6 \leq n \leq 70$, n for each of the block can be different or the same, $3 \leq m \leq 150$, $1 \leq a \leq 100$, $0 \leq b \leq 20$ In some embodiments, the multi-block copolymers of the present invention, when incorporated into gum bases and chewing gums and chewed, produce cohesive cuds which are more easily removed from environmental surfaces if improperly discarded. Cohesive cuds, that is, cuds which display a high degree of self adhesion, tend to contract and curl away from attached surfaces such as concrete. In the case of the multi-block copolymers of the present invention, it is believed that this cohesiveness is due to the formation of microphase separation internal structures which increase the cohesivity of the cud. These internal structures are caused by microphase domain separation and subsequent ordering of the hard and soft domains of the polymer molecules. Depending on the weight ratio and number of the different blocks, lamellar, cylindrical, spherical or gyroidal and/or other microdomain structures may predominate in the polymer matrix, although smaller levels of the other structural domains will likely exist concurrently. It may be difficult to determine which structure predominates in any given system and even small changes in the ratio of the different blocks may produce disproportionate changes in texture due to this phenomenon. This provides a means of adjusting the texture significantly, though perhaps not linearly, by adjusting the ratio up or down. Graphic illustrations of some of the possible microphase separation structures are shown in FIGS. 1a and 1b.

In some embodiments, the multi-block copolymers of the present invention and the gum bases prepared from them produce gum cuds which are environmentally degradable. By environmentally degradable, it is meant that the polymer can be broken into smaller segments by environmental forces such as microbial action, hydrolytic action, oxidation, UV light or consumption by insects. This further reduces or eliminates the aforementioned nuisance of improperly discarded gum cuds. In some embodiments, the multi-block copolymers of the present invention are produced from sources other than petroleum feed stocks for enhanced sustainability and to avoid consumer concerns regarding the use of petroleum derived materials in chewing gum products. In some embodiments, the monomers used to produce the multi-block copolymers, for example D,L-lactide, farnesene, myrcene and isoprene, are or can be produced from renewable resources, typically agricultural crops, trees and natural vegetation.

When used to formulate a gum base of the present invention, it is preferred that the multi-block copolymers of the present inventions be plasticized with a suitable plasticizing agent. One preferred plasticizing agent is a di-block copolymer having polymeric blocks which are compatible with those of the multi-block copolymer It is preferred that the blocks of the di-block copolymer be composed of the same polymers used in the multi-block copolymer. However, other compatible polymers may also be used. It is preferred that the di-block copolymer blocks have no more than roughly half the molecular weight of the corresponding blocks in the multi-block copolymer which the di-block copolymer is plasticizing.

When a multi-block copolymer and a di-block copolymer are used in a multi-block elastomer system, it is preferred that the two components be used in a ratio of from 1:99 to 99:1 and more preferably 40:60 to 95:5 di-block:multi-block to assure that the resulting multi-block elastomer system will have proper texture for processing and chewing. The multi-block copolymers may also be plasticized with a conventional plasticizing agent to form an elastomeric material which, when formulated as a gum base, has sufficient chewing cohesion to be cud-forming and chewable at mouth temperatures. Plasticizers typically function to lower the $T_g$ of a polymer to make the gum cud chewable at mouth temperature. Suitable plasticizers typically are also capable of decreasing the shear modulus of the base. Suitable plasticizing agents are substances of relatively low molecular weight which have a solubility parameter similar to the polymer so they are capable of intimately mixing with the polymer and reducing the $T_g$ of the mixture to a value lower than the polymer alone. Generally, any food acceptable plasticizer which functions to soften the multi-block copolymer and render it chewable at mouth temperature will be a suitable plasticizer. Plasticizers which may be used in the present invention include triacetin, phospholipids such as lecithin and phosphatidylcholine, triglycerides of $C_4$-$C_6$ fatty acid such as glycerol trihexanoate, polyglycerol, polyricinoleate, propylene glycol di-octanoate, propylene glycol di-decanoate, triglycerol penta-caprylate, triglycerol penta-caprate, decaglyceryl hexaoleate, decaglycerol decaoleate, citric acid esters of mono- or di-glycerides, polyoxyethylene sorbitan such as POE (80) sorbitan monolaurate, POE (20) sorbitan monooleate, rosin ester and polyterpene resin.

Fats, waxes and acetylated monoglycerides can enhance the effect of the suitable plasticizers when incorporated into the gum bases of the present invention. However, fats and waxes may not be suitable for use as the sole plasticizers in these compositions.

It is preferred that the multi-block copolymer be pre-blended with the di-block copolymer or other plasticizer, for example by blending in a solvent, or by using mechanical blending at temperatures above the highest glass transition temperature of the multi-block copolymer or by polymerizing the di- and multi-block copolymers together.

The water-insoluble gum base of the present invention may optionally contain conventional petroleum-based elastomers and elastomer plasticizers such as styrene-butadiene rubber, butyl rubber, polyisobutylene, terpene resins and estergums. Where used, these conventional elastomers may be combined in any compatible ratio with the multi-block copolymer. In a preferred embodiment, significant amounts (more than 1 wt. %) of these conventional elastomers and elastomer plasticizers are not incorporated into a gum base of the present invention. In other preferred embodiments, less than 15 wt. % and preferably less than 10 wt. % and more preferably less than 5 wt. % of petroleum-based elastomers and elastomer plasticizers are contained in the gum base of the present invention. Other ingredients which may optionally be employed include inorganic fillers such as calcium carbonate and talc, emulsifiers such as lecithin and mono- and di-glycerides, plastic resins such as polyvinyl acetate, polyvinyl laurate, and vinylacetate/vinyl laurate copolymers, colors and antioxidants.

The water-insoluble gum base of the present invention may constitute from about 5 to about 95% by weight of the chewing gum. More typically it may constitute from about 10 to about 50% by weight of the chewing gum and, in various preferred embodiments, may constitute from about 20 to about 35% by weight of the chewing gum.

A typical gum base useful in this invention includes about 5 to 100 wt. % plasticized multi-block copolymer elastomer, 0 to 20 wt. % synthetic elastomer, 0 to 20 wt. % natural elastomer, about 0 to about 40% by weight elastomer plasticizer, about 0 to about 35 wt. % filler, about 0 to about 35 wt. % softener, and optional minor amounts (e.g., about 1 wt. % or less) of miscellaneous ingredients such as colorants, antioxidants, and the like.

Further, a typical gum base includes at least 5 wt. % and more typically at least 10 wt. % softener and includes up to 35 wt. % and more typically up to 30 wt. % softener. Still further, a typical gum base includes 5 to 40 wt. % and more typically 15 to 30 wt. % hydrophilic modifier such as polyvinylacetate. Minor amounts (e.g., up to about 1 wt. %) of miscellaneous ingredients such as colorants, antioxidants, and the like also may be included into such a gum base.

In an embodiment, a chewing gum base of the present invention contains about 4 to about 35 weight percent filler, about 5 to about 35 weight percent softener, about 5 to about 40% hydrophilic modifier and optional minor amounts (about one percent or less) of miscellaneous ingredients such as colorants, antioxidants, and the like.

Additional elastomers may include, but are not limited to, polyisobutylene having a viscosity average molecular weight of about 100,000 to about 800,000, isobutylene-isoprene copolymer (butyl elastomer), polyolefin thermoplastic elastomers such as ethylene-propylene copolymer and ethylene-octene copolymer, styrene-butadiene copolymers having styrene-butadiene ratios of about 1:3 to about 3:1 and/or polyisoprene, and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof.

The elastomer component of gum bases used in this invention may contain up to 100 wt. % multi-block copolymer. In some embodiments, the multi-block copolymers of the present invention may be combined with compatible plasticizers (including di-block copolymers as previously described) and the plasticized copolymer system may be used as the sole components of a gum base. Alternatively, mixtures of plasticized or unplasticized multi-block copolymers with other elastomers also may be used. In such embodiments, mixtures with conventional elastomeric components of gum bases may comprise least 10 wt. % plasticized or unplasticized multi-block copolymer, typically at least 30 wt. % and preferably at least 50 wt. % of the elastomer. In order to provide for improved removability of discarded gum cuds form environmental surfaces, gum bases of the present invention will contain an elastomeric component which comprises at least 10%, preferably at least 30%, more preferably at least 50% and up to 100 wt. % plasticized or unplasticized multi-block copolymer in addition to other non-elastomeric components which may be present in the gum base. Due to cost limitations, processing requirements, sensory properties and other considerations, it may be desirable to limit the elastomeric component of the gum base to no more than 90%, or 75% or 50% plasticized or unplasticized multi-block copolymer.

A typical gum base containing multi-block copolymers of the present invention may have a complex shear modulus (the measure of the resistance to the deformation) of 1 kPa to 10,000 kPa at 40° C. (measured on a Rheometric Dynamic Analyzer with dynamic temperature steps, 0-100° C. at 3° C./min; parallel plate; 0.5% strain; 10 rad/sec). Preferably, the complex shear modulus will be between 10 kPa and 1000 kPa at the above conditions. Gum bases having shear modulus in these ranges have been found to have acceptable chewing properties.

A suitable multi-block copolymer used in this invention typically should be free of strong, undesirable off-tastes (i.e. objectionable flavors which cannot be masked) and have an ability to incorporate flavor materials which provide a consumer-acceptable flavor sensation. Suitable multi-block copolymers should also be safe and food acceptable, i.e. capable of being food approved by government regulatory agencies for use as a masticatory substance, i.e. chewing gum base. Furthermore, it is preferable that the polymers be prepared using only food safe catalysts, reagents and solvents.

Typically, the multi-block copolymers of the present invention have sufficient chewing cohesion such that a chewing gum composition containing such material forms a discrete gum cud with consumer acceptable chewing characteristics.

Elastomer plasticizers commonly used for petroleum-based elastomers may be optionally used in this invention including but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing.

The preferred elastomer plasticizers also will vary depending on the specific application, and on the type of elastomer which is used.

In addition to natural rosin esters, also called resins, elastomer solvents may include other types of plastic resins. These include polyvinyl acetate having a GPC weight average molecular weight of about 2,000 to about 90,000, polyethylene, vinyl acetate-vinyl laurate copolymer having vinyl laurate content of about 5 to about 50 percent by weight of the copolymer, and combinations thereof. Preferred weight average molecular weights (by GPC) for polyisoprene are 50,000 to 80,000 and for polyvinyl acetate are 10,000 to 65,000 (with higher molecular weight polyvinyl acetates typically used in bubble gum base). For vinyl acetate-vinyl laurate, vinyl laurate content of 10-45 percent by weight of the copolymer is preferred. Preferably, a gum base contains a plastic resin in addition to other materials functioning as elastomer plasticizers.

Additionally, a gum base may include fillers/texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, lecithin, paraffin wax, microcrystalline wax, natural waxes and combinations thereof. Lecithin and mono- and di-glycerides also function as emulsifiers to improve compatibility of the various gum base components.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and multi-calcium phosphate and calcium sulfate. Insoluble organic fillers including cellulose polymers such as wood as well as combinations of any of these also may be used.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

As noted, the base may include wax or be wax-free. An example of a wax-free gum base is disclosed in U.S. Pat. No. 5,286,500, the disclosure of which is incorporated herein by reference.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents (which may be water insoluble), water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% by weight of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed. In the case of syrups and other aqueous solutions, it is generally desirable to use the minimum practical level of water in the solution to the minimum necessary to keep the solution free-flowing at acceptable handling temperatures. The usage level of such syrups and solutions should be adjusted to limit total moisture in the gum to less than 3 wt. %, preferably less than 2 wt. % and most preferably less than 1 wt. %.

High intensity artificial sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia and stevia compounds such as rebaudioside A, dihydrochalcones, thaumatin, monellin, lo han guo and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

In addition to typical chewing gum components, chewing gums of the present invention may include active agents such as dental health actives such as minerals, nutritional supplements such as vitamins, health promoting actives such as antioxidants for example resveratrol, stimulants such as caffeine, medicinal compounds and other such additives. These active agents may be added neat to the gum mass or encapsulated using known means to prolong release and/or prevent degradation. The actives may be added to coatings, rolling compounds and liquid or powder fillings where such are present.

It may be desirable to add components to the gum or gum base composition which enhance environmental degradation of the chewed cud after it is chewed and discarded. For example, an enzyme capable of attacking one or more of the polymeric components (such as one or more of the polymeric blocks in the multi-block copolymer) may be added to the chewing gum formula. In the case of a polyester, an esterase enzyme may be added to accelerate decomposition of the polymer. Alternatively, proteinases such as proteinase K, pronase, and bromelain can be used to degrade poly (lactic acid) and cutinases may be used to degrade poly($\delta$-methyl-$\epsilon$-caprolactone). Such enzymes may be available from Valley Research, Novozymes, and other suppliers. Optionally, the enzyme or other degradation agent may be encapsulated by spray drying, fluid bed encapsulation or other means to delay the release and prevent premature degradation of the cud. It is also possible to immobilize an enzyme into a gum or gum base by grafting it on to a polymer or filler in the gum or gum base to provide extended degradation action which may be necessary to sufficiently control degradation of the multi-block copolymer. Typically, immobilization or grafting is accomplished using glutaraldehyde, oxidized dextran, or some other cross-linking agent with reactivity to chemical functional groups on either the enzyme or the substrate of interest. The degradation agent (whether free, encapsulated or immobilized) may be used in compositions employing multi-block copolymers and multi-block elastomer systems as well as the multi-component systems previously described to further reduce the problems associated with improperly discarded gum cuds.

The present invention may be used with a variety of processes for manufacturing chewing gum including batch mixing, continuous mixing and tableted gum processes.

Chewing gum bases of the present invention may be easily prepared by combining the multi-block copolymer with a suitable plasticizer as previously disclosed. If additional ingredients such as softeners, plastic resins, emulsifiers, fillers, colors and antioxidants are desired, they may be added by conventional batch mixing processes or continuous mixing processes. Process temperatures are generally from about 60° C. to about 130° C. in the case of a batch process. If it is desired to combine the plasticized multi-block copolymer with conventional elastomers, it is preferred that the conventional elastomers be formulated into a conventional gum base before combining with the multi-block copolymer gum base. To produce the conventional gum base, the elastomers are first ground or shredded along with filler. Then the ground elastomer is transferred to a batch mixer for compounding. Essentially any standard, commercially available mixer known in the art (e.g., a Sigma blade mixer) may be used for this purpose. The first step of the mixing process is called compounding. Compounding involves combining the ground elastomer with filler and elastomer plasticizer (elastomer solvent). This compounding step generally requires long mixing times (30 to 70 minutes) to produce a homogeneous mixture. After compounding, additional filler and elastomer plasticizer are added followed by PVAc and finally softeners while mixing to homogeneity after each added ingredient. Minor ingredients such as antioxidants and color may be added at any time in the process. The conventional base is then blended with the multi-block copolymer base in the desired ratio. Whether the multi-block copolymer is used alone or in combination with conventional elastomers, the completed base is then extruded or cast into any desirable shape (e.g., pellets, sheets or slabs) and allowed to cool and solidify.

Alternatively, continuous processes using mixing extruders, which are generally known in the art, may be used to prepare the gum base. In a typical continuous mixing process, initial ingredients (including ground elastomer, if used) are metered continuously into extruder ports various points along the length of the extruder corresponding to the batch processing sequence. After the initial ingredients have massed homogeneously and have been sufficiently compounded, the balance of the base ingredients are metered into ports or injected at various points along the length of the extruder. Typically, any remainder of elastomer component or other components are added after the initial compounding stage. The composition is then further processed to produce a homogeneous mass before discharging from the extruder outlet. Typically, the transit time through the extruder will be substantially less than an hour. If the gum base is prepared from multi-block copolymer without conventional elastomers, it may be possible to reduce the necessary length of the extruder needed to produce a homogeneous gum base with a corresponding reduction in transit time. In addition, the multi-block copolymer need not be pre-ground before addition to the extruder. It is only necessary to ensure that the multi-block copolymer is reasonably free-flowing to allow controlled, metered feeding into the extruder inlet port.

Exemplary methods of extrusion, which may optionally be used in conjunction with the present invention, include the following, the entire contents of each being incorporated herein by reference: (i) U.S. Pat. No. 6,238,710, claims a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) yet another U.S. Pat. No. 5,397,580 discloses continuous gum base manufacture wherein two continuous mixers are arranged in series and the blend from the first continuous mixer is continuously added to the second extruder.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first softening or melting the gum base and adding it to the running mixer. The gum base may alternatively be softened or melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about five to about fifteen minutes, although longer mixing times are sometimes required.

In yet another alternative, it may be possible to prepare the gum base and chewing gum in a single high-efficiency extruder as disclosed in U.S. Pat. No. 5,543,160. Chewing gums of the present invention may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer. In the present invention, it may be necessary to first blend the multi-block copolymer with a suitable plasticizer before incorporation of additional gum base or chewing gum ingredients. This blending and compression process may occur inside the high-efficiency extruder or may be performed externally prior to addition of the plasticized multi-block copolymer composition to the extruder.

Of course, many variations on the basic gum base and chewing gum mixing processes are possible.

After mixing, the chewing gum mass may be formed, for example by rolling or extruding into and desired shape such as sticks, tabs, chunks or pellets. The product may also be filled (for example with a liquid syrup or a powder) and/or coated for example with a hard sugar or polyol coating using known methods.

After forming, and optionally filling and/or coating, the product will typically be packaged in appropriate packaging materials. The purpose of the packaging is to keep the product clean, protect it from environmental elements such as oxygen, moisture and light and to facilitate branding and retail marketing of the product.

EXAMPLES

The following examples of the invention and comparative formulations are provided to illustrate, but not to limit, the invention which is defined by the attached claims. Amounts listed are in weight percent.

Examples 1-7

Poly(D,L-lactide)/poly(ethylene oxide) multiblock copolymers containing urethane linking units were obtained via a 2-step reaction sequence. First, a ring-opening polymerisation of d,l-lactide with poly(ethylene glycol) was catalysed by Sn(II) bis(2-ethylhexanoate) to produce PLA-PEO-PLA tri-block copolymers. This was followed by coupling of the hydroxyl end groups of the triblock precursor polymers with hexamethylene diisocyanate.

Scheme 1

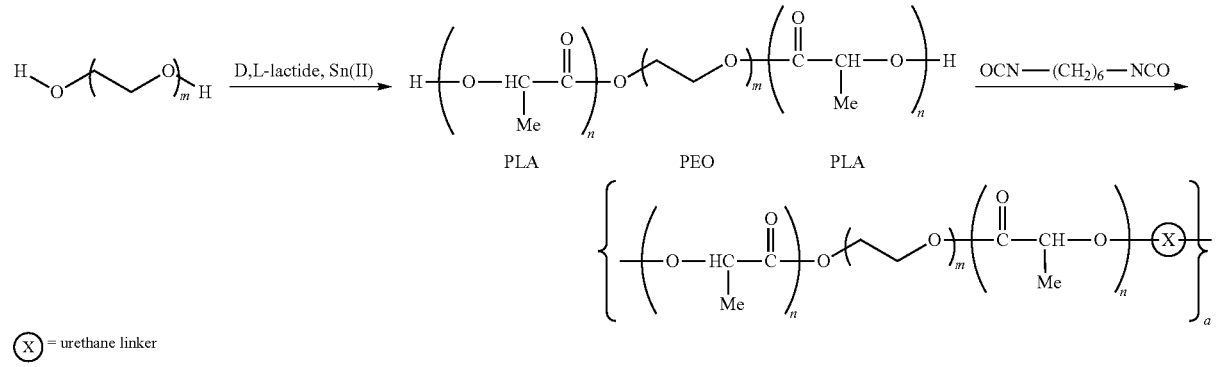

X = urethane linker

The multi-block copolymer of Example 7 was prepared as follows. The remaining Examples 1-6 were prepared similarly.

A sample of poly(ethylene glycol) (PEG, Mn=2,000) (9.523 g, 4.76 mmol) was dried under vacuum and magnetic stirring for 4 hours at 110° C. using a 500 ml round bottom flask with side arm. Three vacuum and $N_2$ gas purges were subsequently applied.

A mixture of D,L-lactide (16.177 g, 0.112 mol) and chlorobenzene, 165 ml, was dried over 4 Å molecular sieves at 62° C. for 12 hours, employing a 500 ml round bottom flask with side arm containing a magnetic stir bar. The flask was then connected to a vacuum line, and three vacuum and $N_2$-refill cycles were applied.

The solution of D,L-lactide (16.177 g, 0.112 mol) in chlorobenzene was transferred via cannula under $N_2$ into the first flask containing the PEG. After that, the flask was heated at 110° C. $Sn(oct)_2$ (0.04547 g, 0.113 mmol was added into the solution. After four hours heating and stirring at 110° C., the temperature was lowered to 80° C., and hexamethylene diisocynate (HDI) (0.9609 g, 5.71 mmol was slowly added through a septum cap. After approximately one hour heating, the solution was observed to become very viscous and cloudy. After a total reaction time of 4 hours, diethylene glycol (0.2838 g, 2.67 mmol was added at 80° C., and heating was continued for 2 hours. After the reaction mixture was cooled to room temperature, the polymer product was precipitated with methanol. First, the viscous polymer solution was poured into a beaker containing approximately 1000 ml of methanol and magnetic stir bar. The mixture was stirred for 30 min. Then, the liquid phase was decanted and replaced with another 1000 ml of methanol. The mixture was stirred for 30 min, and the liquid phase was decanted. Addition of methanol, stirring and decanting was repeated.

The polymer product was collected and dried under vacuum for 24 hours at 40° C. Yield of crude product: 19 g. (71%).

Further Work-Up and Characterization

After drying the polymer was dissolved in 500 ml of dichloromethane and then precipitated again in methanol. The liquid phase was decanted and the polymer collected. The product was dried under vacuum at 40° C. for 24 hours. Final product yield: 16 g. Molecular mass values were $M_n$=17,200, $M_w$=47,100 (GPC, solvent=THF), Glass transition temperature $T_g$=−12° C. (DSC). Is this the characterization for above or for The PLA and PEO blocks are miscible, i.e., they form a single polymer phase, which displays by a single glass transition temperature $T_g$ (Table 1), which increases with increasing PLA content. FIG. 2 shows a plot of the polymer glass transition temperature against the weight fraction of PLA in the multiblock copolymers.

Table 1 Multiblock Copolymer Compositions and their glass transition temperatures The "Composition" column gives the molar mass compositions of the PLA and PEO segments, X represents the urethane linking units, product molar masses Mn and Mw were determined by GPC and the glass transition temperatures were recorded by DSC

TABLE 1

| Ex. # | Composition [PLA-PEO-PLA-X]$_n$ | Weight-fraction-PLA | $M_n$ (GPC) | $M_w$ (GPC) | $T_g$ (DSC) |
|---|---|---|---|---|---|
| Ex. 1 | [1k-1k-1k-X]$_n$ | 0.67 | 24,700 | 44,400 | −2° C. |
| Ex. 2 | [1.5k-1k-1.5k-X]$_n$ | 0.75 | 26,500 | 61,100 | 11° C. |
| Ex. 3 | [1k-1.5k-1k-X]$_n$ | 0.57 | 9,900 | 53,900 | −15° C. |
| Ex. 4 | [1.5k-1.5k-1.5k-X]$_n$ | 0.67 | 10,300 | 60,400 | −2° C. |
| Ex. 5 | [1.7k-1.5k-1.7k-X]$_n$ | 0.69 | 16,500 | 37,200 | −1° C. |

TABLE 1-continued

| Ex. # | Composition [PLA-PEO-PLA-X]$_n$ | Weight-fraction-PLA | $M_n$ (GPC) | $M_w$ (GPC) | $T_g$ (DSC) |
|---|---|---|---|---|---|
| Ex. 6 | [2.0k-1.5k-2.0k-X]$_n$ | 0.73 | 12,400 | 56,300 | 8° C. |
| Ex. 7 | [1.7k-2.0k-1.7k-X]$_n$ | 0.63 | 17,170 | 47,113 | −14° C. |

Figure 6:
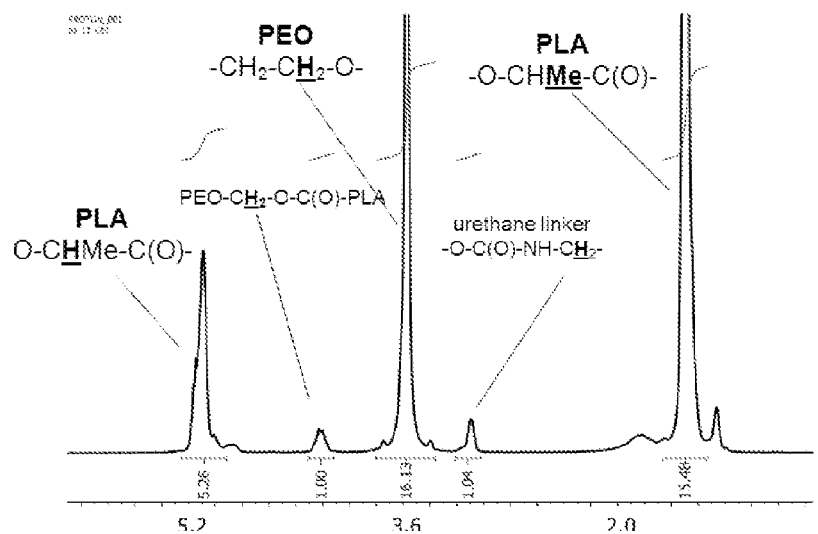
FIG. 6 is an nmr spectrum of the multi-block copolymer of Example 5.

NMR spectrums of the multi-block copolymers of Examples 5 and 7 are shown as FIGS. 6 and 4 respectively.

Example 8

Chewing gum can be made using the polymer of Example 1 according to Table 2.

TABLE 2

| Ingredient | Example 8 % by weight |
|---|---|
| Gum Base Components | |
| Multi-block copolymer of Ex. 1 | 85.38 |
| Microcrystalline Wax | 7.31 |
| Calcium Carbonate | 7.31 |
| Total gum Base | 100.00 |
| Chewing Gum Components | |
| Gum Base (from above) | 52.70 |
| Sorbitol | 31.70 |
| Glycerin (99%) | 8.50 |
| Peppermint Flavor | 6.35 |
| High-Intensity Sweetener | 0.75 |
| Total Gum | 100.00 |

Examples 9-14

Chewing gums can be made according to the formulas presented in Table 2 by substituting the multi-block copolymers of Examples 2-7 for that of Example 1. These chewing gums are designated Examples 9-14 respectively.

Examples 15-18

Gum bases and chewing gums can be made from the multi-block copolymer of Example 1 according to the formulas presented in Table 3.

TABLE 3

| | Ex. 15 | Ex. 16 | Ex. 17 | Ex. 18 |
|---|---|---|---|---|
| Gum Base Components | | | | |
| Multi-block copolymer of Ex. 1 | 11.00 | 4.00 | 21.00 | 18.00 |
| Butyl Rubber | 3.10 | 5.10 | — | — |
| Polyisobutylene (low MW) | 9.10 | 7.50 | 11.00 | — |
| Terpene Resin | 18.00 | 14.00 | 19.50 | 3.00 |
| Polyvinyl Acetate (low MW) | 15.00 | 13.00 | 25.50 | 30.00 |
| Lecithin | 2.00 | 1.50 | 3.00 | 2.50 |
| Calcium Carbonate | 16.80 | 30.90 | — | 28.50 |
| Microcrystalline Wax | 3.00 | 3.00 | 4.00 | — |
| Hydrogenated Vegetable Oil | 22.00 | 21.00 | 16.00 | 18.00 |
| Total Gum Base | 100.00 | 100.00 | 100.00 | 100.00 |
| Chewing Gum Components | | | | |
| Gum base (from above) | 35.00 | 38.00 | 30.00 | 40.00 |
| Sorbitol | 53.55 | 53.00 | 58.05 | 53.00 |

TABLE 3-continued

|  | Ex. 15 | Ex. 16 | Ex. 17 | Ex. 18 |
|---|---|---|---|---|
| Hydrogenated Starch Hydrolysate Syrup (85% solids) | 8.00 | 5.00 | 8.50 | — |
| Peppermint flavor | 1.00 | 1.20 | 1.10 | 1.50 |
| Glycerin (99%) | 2.00 | 2.50 | 2.00 | 5.00 |
| Lecithin | 0.15 | 0.10 | 0.15 | — |
| Encapsulated sucralose | 0.30 | 0.20 | 0.20 | 0.50 |
| Total Gum | 100.00 | 100.00 | 100.00 | 100.00 |

Examples 19-42

Chewing gum bases and chewing gums can be made from the multi-block copolymers of Examples 2-7 by substituting them into the formulas in Table 3. These chewing gums are designated Examples 19-42 according to Table 4.

TABLE 4

| Example # | Multi-block copolymer Example # | Formulation Example # from Table 3 |
|---|---|---|
| 19 | 2 | 15 |
| 20 | 3 | 15 |
| 21 | 4 | 15 |
| 22 | 5 | 15 |
| 23 | 6 | 15 |
| 24 | 7 | 15 |
| 25 | 2 | 16 |
| 26 | 3 | 16 |
| 27 | 4 | 16 |
| 28 | 5 | 16 |
| 29 | 6 | 16 |
| 30 | 7 | 16 |
| 31 | 2 | 17 |
| 32 | 3 | 17 |
| 33 | 4 | 17 |
| 34 | 5 | 17 |
| 35 | 6 | 17 |
| 36 | 7 | 17 |
| 37 | 2 | 18 |
| 38 | 3 | 18 |
| 39 | 4 | 18 |
| 40 | 5 | 18 |
| 41 | 6 | 18 |
| 42 | 7 | 18 |

Example 43

A [PLA-PEO-PLA-X—]$_n$ Multiblock Copolymer having urethane linking units (—O—C(O)—NH—(CH$_2$)$_6$—NH—C(O)—O—) was prepared as follows.

Drying of Materials

Poly(ethylene glycol) (PEG, Mn=2,000) (3.0153 g, 1.5076 mmol) was dried under vacuum and magnetic stirring for 4 hours at 110° C., using a 250 ml round bottom flask with side arm.

A mixture of D,L-lactide (5.1159 g, 0.0355 mol) and 70 ml of chlorobenzene was dried over 4 Å molecular sieves at 62° C. for 12 hours, using a 250 ml round bottom flask with side arm and a magnetic bar. The flask was then connected to a vacuum line, and three vacuum/N$_2$ purge cycles were applied. Three vacuum/N$_2$-refill cycles were also applied to the flask containing the PEG.

Lactide Polymerization and Coupling with Diisocyanate

The solution of D,L-lactide (5.116 g, 0.0355 mol) in chlorobenzene was transferred via cannula (under N$_2$) into the first flask containing the PEG. After that, the flask was heated at 110° C. Sn(oct)$_2$ (0.0144 g, 0.0355 mmol was added into the solution, and heating was continued for 4 hours. Then, hexamethylene diisocyanate (HDI) (0.3296 g, 1.959 mmol) was added slowly at 80° C. (via syringe through a septum cap). After approximately one hour heating and stirring, the solution was observed to become very viscous and cloudy. After a total reaction time of 4 hours, diethylene glycol (0.1265 g, 1.192 mmol) was added at 80° C., and heating was continued for 2 hours. After the reaction mixture was cooled to room temperature, the polymer product was precipitated by addition to methanol. First, the viscous polymer solution was poured into a beaker containing approximately 400 ml of methanol and a magnetic stir bar. The mixture was stirred for 30 min., then the liquid phase was decanted and replaced with another 400 ml of methanol and stirred for another 30 minutes. The liquid phase was decanted. Addition of methanol, stirring and decanting was repeated. Then, the polymer was dried under vacuum at 40° C. for 24 hours. The yield of crude product was 6 g.

The polymer was mechanically quite strong.

Further Work-Up Procedure:

After drying, the polymer was dissolved in 100 ml of dichloromethane and then precipitated again in methanol. The methanol was decanted, and the polymer was dried under vacuum at 40° C. for 24 hours. Yield of final product=4.5 g.

Example 44

A [PLA-PDMS-PLA-X—]$_n$ Multi-block copolymer having a urethane linking unit X=—O—C(O)—NH—(CH2)6-NH—C(O)—O— was prepared as follows. The block weight of PDMS block was $M_n$=5,000 and PDLLA block weight was $M_n$=720.

A 250 ml round-bottom flask with side arm containing a stir bar was dried under vacuum using a heat gun. The flask was charged with polydimethylsiloxane (PDMS, Mn=5,000) (21.51 g, 4.30 mmol) and placed under vacuum at 50° C. for 1 hour. Under nitrogen, D,L-lactide (7.39 g, 51.3 mmol) was added into the flask, followed by dry chlorobenzene (180 ml). The mixture was brought to 80° C. with stirring to dissolve the D,L-lactide. Then, the temperature was lowered to 60° C., and 4 Å molecular sieves were added. The solution was left at 60° C. for 12 hours.

The solution was cannula-transferred into a pre-weighed, vacuum-heated 250 ml round bottom flask with side arm. By weighing, it was established that the receiving flask contained 20.22 g (4.04 mmol) and 6.95 g (48.2 mmol) of D,L-lactide. A large proportion of the chlorobenzene was removed by distillation. The mixture of PDMS, D,L-lactide and chlorobenzene subsequently remaining in the flask had a weight of 78.76 g. The mixture was heated to 110° C. and Sn(II) bis(2-ethylhexanoate) (24.0 mg, 59.2 μmol) was added. The reaction was carried out for 2.5 hours at 110° C. The resulting solution was clear in appearance.

A 1.16 g quantity of the reaction mixture was removed from the reaction flask. The remainder in the flask contained 4.00 mmol of triblock copolymer which was subsequently reacted with the diisocyanate coupling reagent.

The temperature of the reaction mixture was lowered to 80° C. Hexamethylene diisocyanate (550 mg, 3.27 mmol) was added to the triblock copolymer solution corresponding to a 0.8:1 mole ratio of diisocyanate:triblock copolymer. The reaction was performed for 2 hours at 80° C. Then, more diisocyanate (124.3 mg, 0.74 mmol) was added in order to increase the mole ratio of diisocyanate:triblock copolymer to 1:1. The mixture was heated for an additional 2 hours at 80° C. 1H NMR spectra showed that the diisocyanate had been consumed. A sample of 0.817 g of the reaction mixture was removed for analysis. A third portion of hexamethylene diisocyanate (72.5 mg, 0.43 mmol) was added, and the mixture was heated for an additional 2 hours to 80° C. The stir bar did not move any more after 1 hour of reaction. The reaction mixture had turned into a colourless gel.

Figure 5:
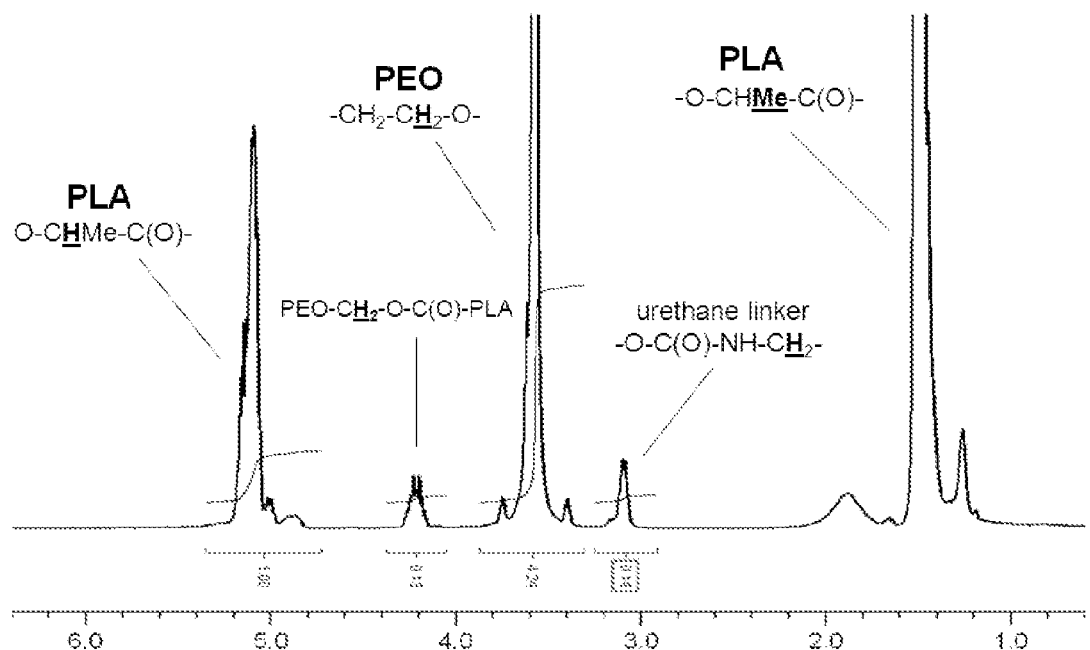
FIG. 5 is an nmr spectrum of the multi-block copolymer of Example 44.

The product was transferred into a beaker. Chlorobenzene (150 ml) was added, and the mixture was left to stir for 2 days at room temperature. A viscous solution was obtained which contained a small amount of gel particles. It was poured slowly into 400 ml of methanol to precipitate the multiblock copolymer. The precipitate was washed with 2×300 ml of methanol. The polymer product was filtered and dried under vacuum at 50° C. for 48 hours. Product yield: 21.76 g. Molecular mass values were $M_n$=67,300, $M_w$=327,000 (GPC, solvent THF). An NMR spectrum of the multi-block copolymer of Example 44 is shown as FIG. 5.

Examples 45, 46 and Comparative Run 47

Chewing gums were made according to the formulas in Table 5. Quantities listed are percent by weight.

TABLE 5

|  | Example 45 | Example 46 | Comparative Run 47 |
|---|---|---|---|
| Sorbitol | 56.30 | 56.30 | 56.30 |
| Multi-block Copolymer of Example 5 | 32.00 | — | — |
| Multi-block Copolymer of Example 44 | — | 32.00 | — |
| Commercial Gum Base | — | — | 32.00 |
| Triacetin | 2.00 |  |  |
| Acetylated Monoglyceride | 2.00 |  |  |
| Glycerin | 5.20 | 5.20 | 5.20 |
| Peppermint Flavor | 2.00 | 2.00 | 2.00 |
| High Intensity Sweetener | 0.50 | 0.50 | 0.50 |
| Total | 100.00 | 100.00 | 100.00 |

Example 45 processed acceptably after softener addition. It was sheeted into pellets but there were problems with misshapen pellets due to excess elasticity. Example 46 was very difficult to mix. Doubling the amount of softener helped but the product was not sheeted.

Example 48

Figure 7:
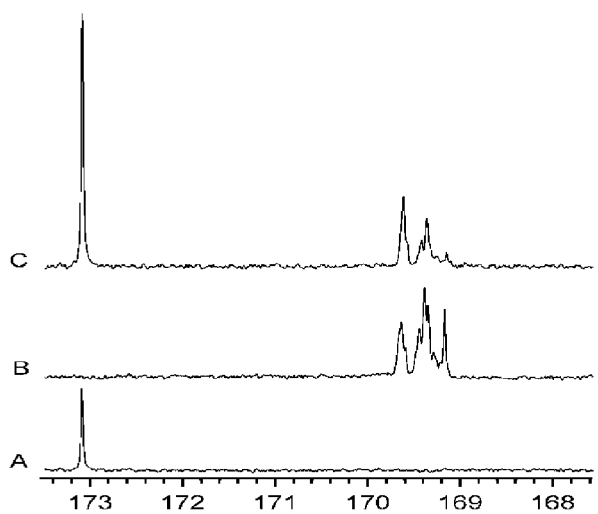
FIG. 7 is an nmr spectrum of the polymers of Examples 48 and 49 and of poly(D,L-lactide.

A homopolymer of δ-decalactone (delta decalactone) was prepared as follows. In a glovebox, 1,4-benzenedimethanol (0.0272 g, 0.197 mmol) and δ-decalactone (5.00 g, 29.4 mmol) were combined in a 15 mL glass pressure vessel equipped with a magnetic stir bar. The mixture was stirred until the initiator was dissolved. 1,5,7-triazabicyclo[4.4.0]dec-5-ene (TBD) (0.0102 g, 0.0733 mmol) was then added to the reaction mixture, the vessel was sealed, removed from the glovebox, and placed on a magnetic stir plate as quickly as possible. To quench the reaction, an approximately equal volume of the quench solution (1 M benzoic acid in chloroform) to the initial monomer volume was added. Additional chloroform was then added to dissolve the polymer. The dissolved polymer was then precipitated in methanol. The residual solvent was removed under vacuum (30 mTorr). Conversion by 1H NMR spectroscopy of the crude solution and gravimetric yield after precipitation were both 71%. Mn of the precipitated polymer was found to be 17.5 kg mol-1 by 1H NMR spectroscopy and 23.1 kg mol-1 by SEC with a PDI of 1.16. 1H NMR (CDCl3) δ; 13C{1H} NMR (CDCl3) δ 173.1, 73.7, 34.2, 34.0, 33.5, 31.7, 25.0, 22.6, 20.8, 14.0. The $^{13}$C nmr spectrum of the resulting poly(δ-decalactone) is shown as FIG. 7.

Example 49

A polylactide-poly(δ-decalactone)-polylactide triblock copolymer was prepared by polymerizing δ-decalactone as in Example 48, except that a solution of lactide (35 wt %) in methylene chloride after the polymerization of δ-decalactone reached equilibrium conversion (~90%) and prior to quenching the reaction. After one hour the lactide polymerization was quenched with excess benzoic acid. The resulting tri-block copolymer was suitable for use as a gum base elastomer. It should be possible to use this tri-block copolymer as a starting material to prepare a multi-block copolymer of the present invention which would also be suitable for use as a gum base elastomer.

What is claimed is:

1. A chewing gum composition comprising at least a flavoring agent, a sweetener and a chewing gum base comprising a multi-block copolymer having at least four homopolymeric blocks, each homopolymer block having at least three monomeric units, wherein the multi-block copolymer comprises a repeating sequence of at least two different homopolymeric blocks, wherein at least one of the homopolymeric blocks is a polyester selected from the group consisting of polyester homopolymers of lactic acid, D,L-lactide, D-lactide, L-lactide, and combinations thereof, and wherein there are at least two such sequences present in the multi-block copolymer.

2. The chewing gum of claim 1 wherein the multi-block copolymer comprises a linking unit between each sequence.

3. The chewing gum of claim 2 wherein the linking unit is selected from the group consisting of urethanes, esters, amides, carbonates, carbamates, urea dialkylsiloxy- and diarylsiloxy-based units, ethers, thioethers and olefins.

4. The chewing gum of claim 1 in which the molecular weight ($M_n$) of the multi-block copolymer is at least 5,000 daltons.

5. The chewing gum of claim 1 in which the molecular weight ($M_n$) of the multi-block copolymer is at least 50,000 daltons.

6. The chewing gum of claim 1 in which the molecular weight ($M_n$) of the multi-block copolymer is at least 200,000 daltons.

7. The chewing gum of claim 1 in which the molecular weight ($M_n$) of the multi-block copolymer is at least 500,000 daltons.

8. The chewing gum of claim 1 wherein the multiblock copolymer comprises a repeating sequence of exactly two different homopolymeric blocks, one of which is a polyester selected from the group consisting of polyester homopolymers of lactic acid, D,L-lactide, D-lactide, L-lactide, and combinations thereof.

9. The chewing gum of claim 1 wherein the multiblock copolymer comprises a repeating sequence of exactly three different homopolymeric blocks, two of which are polyesters selected from the group consisting of polyester homopolymers of lactic acid, D,L-lactide, D-lactide, L-lactide, and combinations thereof.

10. The chewing gum of claim 1 wherein the multi-block copolymer comprises a repeating sequence of four or more different homopolymeric blocks.

11. The chewing gum of claim 1 wherein the multi-block copolymer comprises at least three repeating sequences.

12. The chewing gum of claim 1 wherein the multi-block copolymer comprises at least four repeating sequences.

13. The chewing gum of claim 1 wherein the multi-block copolymer exhibits a single glass transition temperature.

14. The chewing gum of claim 1 wherein the multi-block copolymer exhibits at least two glass transition temperatures.

15. The chewing gum of claim 14 wherein the highest glass transition temperature is between 20° C. and 70° C.

16. The chewing gum of claim 14 wherein the highest glass transition temperature is between 30° C. and 50° C.

17. The chewing gum of claim 15 wherein the multi-block copolymer has a second glass transition temperature below 40° C.

18. The chewing gum of claim 15 wherein the multi-block copolymer has a second glass transition temperature below 30° C.

19. The chewing gum of claim 15 wherein the multi-block copolymer has a second glass transition temperature below 20° C.

20. The chewing gum of claim 1 wherein the gum base further comprises a di-block copolymer.

\* \* \* \* \*